(12) United States Patent
Harms et al.

(10) Patent No.: US 7,332,081 B2
(45) Date of Patent: Feb. 19, 2008

(54) FILTER DEVICE FOR THE CLARIFICATION OF CONTAMINATED LIQUIDS

(75) Inventors: Eberhard Harms, Mupperg (DE); Mark Grigo, Sonneberg (DE)

(73) Assignee: Hans Huber AG, Berching (DE)

( * ) Notice: Subject to any disclaimer, the term of this patent is extended or adjusted under 35 U.S.C. 154(b) by 0 days.

(21) Appl. No.: 11/332,506

(22) Filed: Jan. 16, 2006

(65) Prior Publication Data
US 2006/0186034 A1 Aug. 24, 2006

Related U.S. Application Data

(62) Division of application No. 10/258,257, filed on Jan. 14, 2003, now Pat. No. 7,037,427.

(51) Int. Cl.
*B01D 33/21* (2006.01)
(52) U.S. Cl. .................. 210/331; 210/332; 210/416.1; 210/456
(58) Field of Classification Search ........ 210/330–332, 210/346, 416.1, 456
See application file for complete search history.

(56) References Cited

U.S. PATENT DOCUMENTS 1,634,720 A * 7/1927 Mills et al. ................. 210/345
5,707,517 A * 1/1998 Rolchigo et al. ........... 210/232
5,944,988 A * 8/1999 Shaik ....................... 210/198.2

FOREIGN PATENT DOCUMENTS

| DE | 19537578 A | * | 4/1997 |
| EP | 289674 A | * | 11/1988 |
| SU | 1695963 A | * | 12/1991 |

* cited by examiner

*Primary Examiner*—Matthew O. Savage
(74) *Attorney, Agent, or Firm*—Dority & Manning, P.A.

(57) ABSTRACT

A filter device for the clarification of contaminated liquids includes a vessel configured to contain the liquid to be clarified. A first carrying disk is arranged within the vessel and is rotationally driven about a rotational axis. Mounting rods are attached to and extend generally perpendicular from the carrying disk. A plurality of filter modules including spaced apart filter elements extend generally parallel to the carrying disk. Each of the filter modules is rotationally fixed relative to the carrying disk at least in part by the mounting rods. The filter modules have a radially inward end spaced radially from the rotational axis of the carrying disk. The ends of the filter modules circumscribe a cavity within the vessel having a longitudinal axis corresponding to the rotational axis of the carrying disk. The cavity is configured such that a cleaning fluid medium from within the cavity flows radially out from said cavity and between the filter elements to clean the filter elements.

10 Claims, 5 Drawing Sheets

FILTER DEVICE FOR THE CLARIFICATION OF CONTAMINATED LIQUIDS

RELATED APPLICATION

The present application is a Divisional Application of U.S. application Ser. No. 10/258,257 filed on Jan. 14, 2003, now U.S. Pat. No. 7,037,427.

BACKGROUND OF THE INVENTION

Field of the Invention

The invention relates to filter devices which are used for the clarification of contaminated liquids, in particular in sewage purification and water treatment.

Filter devices of this type consist of a plurality of filter elements which are spaced apart from one another and which are combined into filter modules and are arranged rotatably in a circular or polygonal form of construction in a vessel containing the filter liquid. The filter elements consist of filter disks which are equipped on both sides with filters and which have grooves for discharging the filtrate. At the commencement of the rotational movement of the filter modules in the still stationary filter liquid, a flow resistance occurs on the filter surfaces which initially prevents solids retained on the filter surfaces from being deposited due to the high relative speed between the filer device and the liquid. With an increasing period of rotation of the filter device, however, the initial flow resistance decreases, because the filter liquid is circulated to an increasing extent and the relative speed between the filter device and the liquid becomes lower, so that, as the filter time progresses, what may be referred to as covering layers of solids are formed on the filters and are detrimental to the efficiency of the filter device.

It is known from DE 195 37 578, for the elimination of the filtration-inhibiting covering layer on the filters, to provide on the filters a backwash device consisting of a plurality of suction-extraction bars which bear on the filters on both sides of the filter disk and extend radially from the outside inward. The individual suction-extraction bars are connected to downpipes and are connected to a suction pump via further pipeline systems. By built-in slides in the downpipes being opened, clarified liquid is forced out of the interior of the filter disks into the suction-extraction bars, in order thereby to free the filter surfaces of the adhering solid layers. If cleaning is insufficient, backwashing may be further reinforced by the connected suction pump. In this cleaning process, the suction-extraction bars cause mechanical wear at the filters and thus impair their useful life. In addition to the backwash device, a device for the intensive cleaning of the filters is also provided. This consists of a set of injection pipes which are extended vertically as far as the hollow shaft and the spray nozzles of which are fed with already clarified liquid by a high-pressure pump. One disadvantage of this is that the clarified liquid used for cleaning the filters, due to being enriched with solids, flows back into the vessel again and undergoes a filter process once more, thus leading to a reduction in filter capacity. The outlay involved in the backwash and intensive-cleaning device in mechanical and control terms is appreciable. The result of discontinuous cleaning is that during the filter process, between the cleaning phases, new covering layers of retained solids are repeatedly formed on the filters and have an adverse influence on the efficiency of the filter process.

Furthermore, EP-A-0 289 674 discloses a filter device which operates according to the centrifuge principle. For this purpose, a hollow shaft, on which filter elements are fastened, spaced apart, next to one another, is rotatably arranged vertically in a closed vessel. The hollow shaft has, below the vessel, an inlet valve for supplying the filter liquid and, above the vessel, an inlet valve for supplying a backwashing agent. First, with the inlet valve for the backwash closed, filter liquid is introduced into the hollow shaft via the lower inlet valve. As a result of the centrifugal force occurring during rotation, the filter liquid passes through the holes of the hollow shaft and infiltrates between the adjacent filter elements. The centrifugal force causes external pressure to be exerted on the filter disks, so that the filtrate penetrates into the interior of the filter disks, is discharged on the periphery of the disks by means of pipelines and is intercepted in a trough above the closed vessel, from where it can flow away. During the filter operation, even here, filtration-inhibiting covering layers are formed on the filter surfaces and, as the filter time progresses, inhibit the filter process. Backwashing is therefore regularly necessary. The supply of filter liquid is interrupted for the time of the backwash and a backwashing medium is introduced under high pressure into the hollows haft via the inlet valve for the backwash, which backwashing medium consists of either clear filtrate, air or gas and flows out via the holes in the hollow shaft between the adjacent filter disks and thus eliminates the filtration-inhibiting covering layers from the filter surfaces. The backwash entails a relatively high technical outlay. Moreover, the efficiency of the filter process is impaired.

SUMMARY OF THE INVENTION

The object on which the invention is based is, while avoiding the disadvantages of the prior art, to provide a filter device for the clarification of contaminated liquids, by means of which automatic, continuous and wear-free cleaning of the filters is achieved and which thus prevents the situation where, during the filter operation, filtration-inhibiting solid deposits (covering layers), which have an adverse influence on the filter process, are formed on the filters.

The object is achieved, according to the invention, in that the filter modules form centrally a cavity which on one side is closed by means of a carrying disk and on the other side is connected to the vessel via a suction-intake orifice, and in that the cavity is connected operatively to a flow member in such a way that, via the suction-intake orifice, a flow can be generated in the unclarified liquid between the spaced-apart filter elements and avoids an adhesion of solids to the filter elements.

As a result, constant flow resistance is generated due to the swirling of the unclarified liquid between the adjacent filter elements, and automatic, continuous and wear-free cleaning of the filters is brought about without any mechanical action. Filtration-inhibiting covering layers due to solid deposits on the filters thus remain avoided, so that the filtration efficiency is improved. Only the unclarified liquid in the vessel serves for the cleaning process, so that already clarified liquid no longer has to be returned into the filter circuit, with the result that the filter capacity is increased, as compared with conventional filter devices. The invention can be implemented without a high technical outlay and at low costs and, moreover, is maintenance-friendly. Expediently, the filter modules are lined up on rods and are supported, on the one hand, in a bearing via a driveshaft connected firmly to the carrying disk and, on the other hand, in a bearing via a bearing flange having the suction-intake orifice.

Advantageously, the flow member is designed as a pump vane wheel and is connected to a driveshaft via the carrying disk connected to the filter modules. A pump action is thereby generated at the same time by means of the filter device and during the filter operation causes an intensive flow of the filter liquid through between the spaced-apart filter elements, with a cleaning effect taking place simultaneously. By virtue of the integrated pump vane wheel, a separate drive becomes unnecessary and the costs are reduced.

According to a further feature of the invention, an axial vane wheel connected to a separate motor is arranged in the suction-intake orifice of the bearing flange. Consequently, the rotational speed of the flow member can be regulated, irrespective of the rotational speed of the filter device, and the flow velocity of the filter liquid on the filter surfaces can thus be controlled.

According to another feature, there is provision for a flow duct to be inserted through the suction-intake orifice of the bearing flange and to be fastened in a support bearing, the flow duct being connected, on the one hand, to the vessel by means of a suction-intake orifice and, on the other hand, to the cavity by means of a slot-shaped orifice. As a result, an even higher flow velocity can be achieved between the filter elements and the cleaning effect can be further intensified.

Finally, according to a last feature, there is provision for the flow duct to be inserted through the suction-intake orifice of the bearing flange and to be fastened in a support bearing, the flow duct being connected by means of a suction-intake orifice to a pipeline which issues with a suction-intake orifice below the filter device on the vessel, and a liquid pump being integrated into the pipeline.

The invention will be explained in more detail below by means of an exemplary embodiment with the accompanying drawings.

IN THE DRAWINGS

DETAILED DESCRIPTION

Reference will now be made in detail to the presently claimed embodiments of the invention, one or more examples of which are shown in the figure. Each example is provided to explain, and not is a limitation of the invention. In fact, features illustrated or described as part of one embodiment can be used with another embodiment to yield still a further embodiment. It is intended that the present invention cover such modifications and variations.

Figure 1:
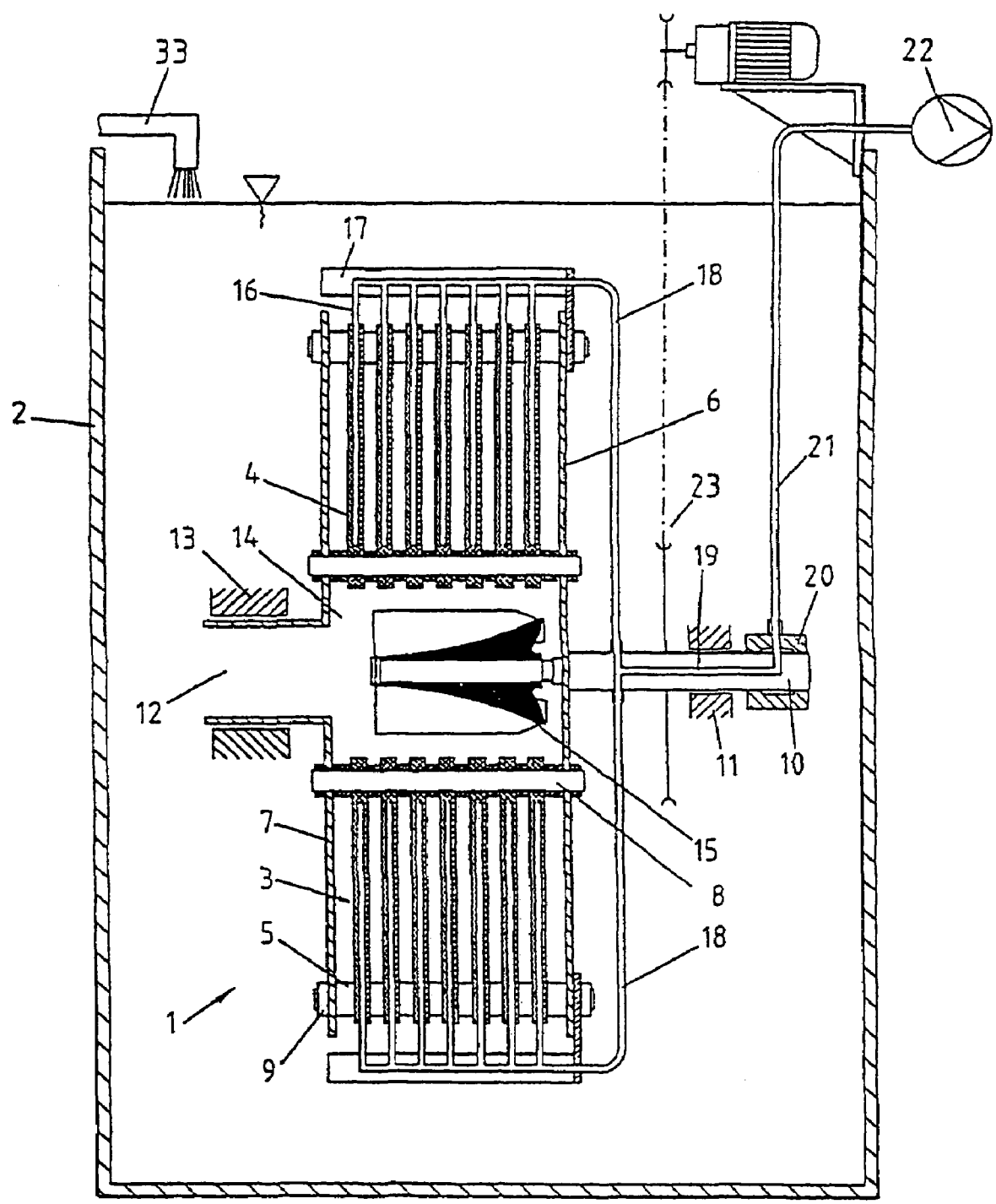
FIG. 1 shows a diagrammatic illustration of the filter device with a pump vane wheel.

The filter device 1 is accommodated rotatably in a vessel 2 containing the filter liquid. In this case, a plurality of filter modules 3 are arranged circularly. The filter modules 3 are composed of individual filter elements 4 with a spacing of preferably 4 to 8 mm. The filter elements 4 consist of known filter disks, not illustrated in the drawing, via which the filtrate is discharged and which are equipped on both sides with filters. The spacing between the filter elements 4 is produced by means of spacer disks 5. The filter modules 3 are delimited, on the one hand, by a carrying disk 6 and, on the other hand, by a bearing flange 7 and are fastened by means of rods 8 and nuts 9. The carrying disk 6 is firmly connected to a driveshaft 10 and is supported rotatably in a bearing 11. The bearing flange 7 has a suction-intake orifice 12 and is guided in a bearing 13. A cavity 14 formed by the filter modules 3 is connected via the suction-intake orifice 12 to the vessel 2 containing the filter liquid. Arranged in the cavity 14 is a flow member which is designed as a pump vane wheel 15 and which is connected to the drive shaft 10 via the carrying disk 6. The individual filter elements 4 are connected to suction-extraction lines 16 which are connected to duct strips 17 fastened to the carrying disk 6 and which issue onto the end-face pipelines 18 which run on the end face of the carrying disk 6 in a star-shaped manner according to the number of filter modules 3 and which are fastened on the driveshaft 10. The pipelines 18 are connected via connecting ducts 19 and a sliding ring 20 which is arranged on the driveshaft 10 and to which is connected a further pipeline 21 leading to a vacuum pump 22. The filter device 1 is connected to a chain drive 23 via the driveshaft 10 (FIG. 1).

Figure 2:
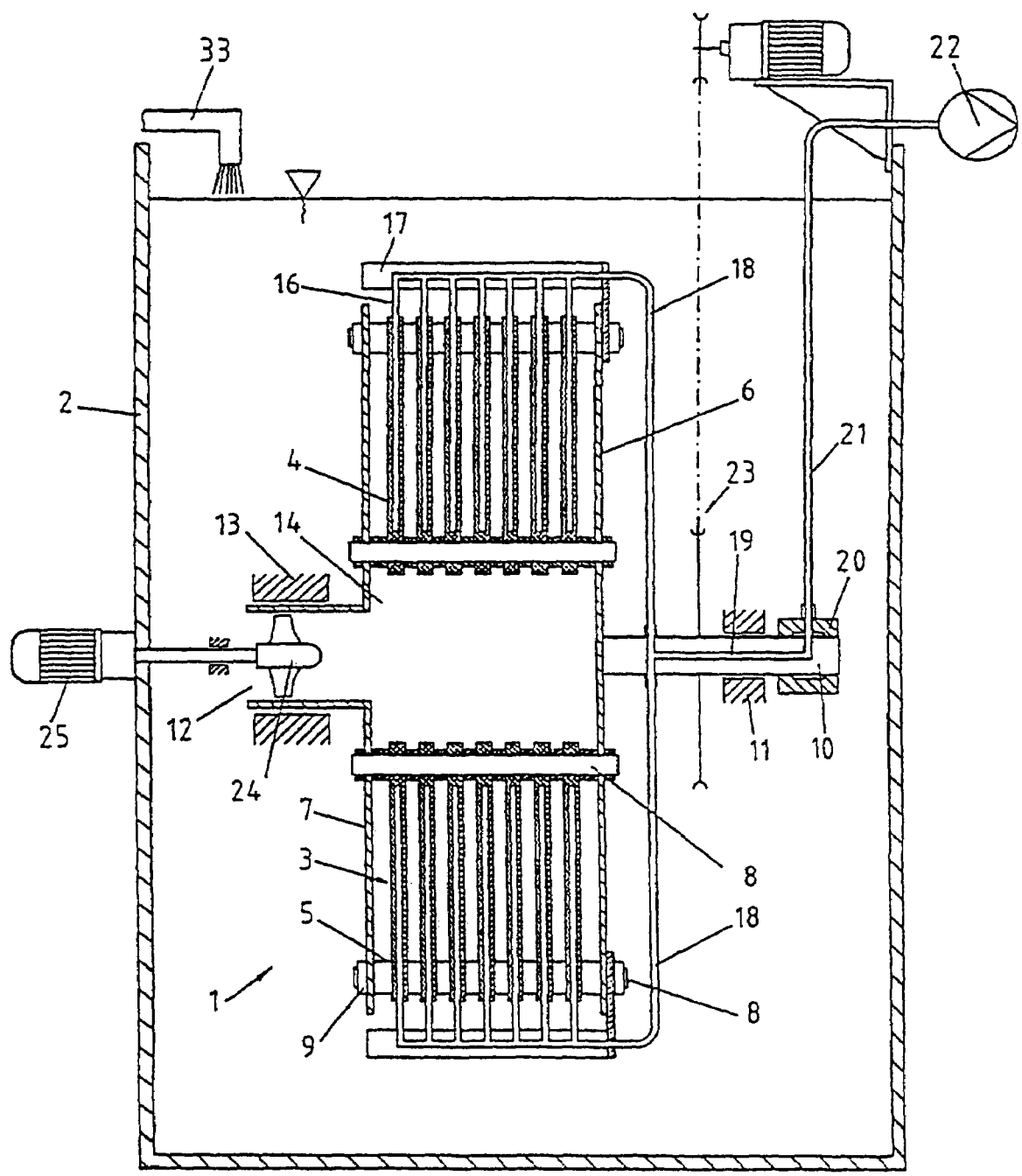
FIG. 2 shows a design variant with a separately driven axial vane wheel.
Figure 3:
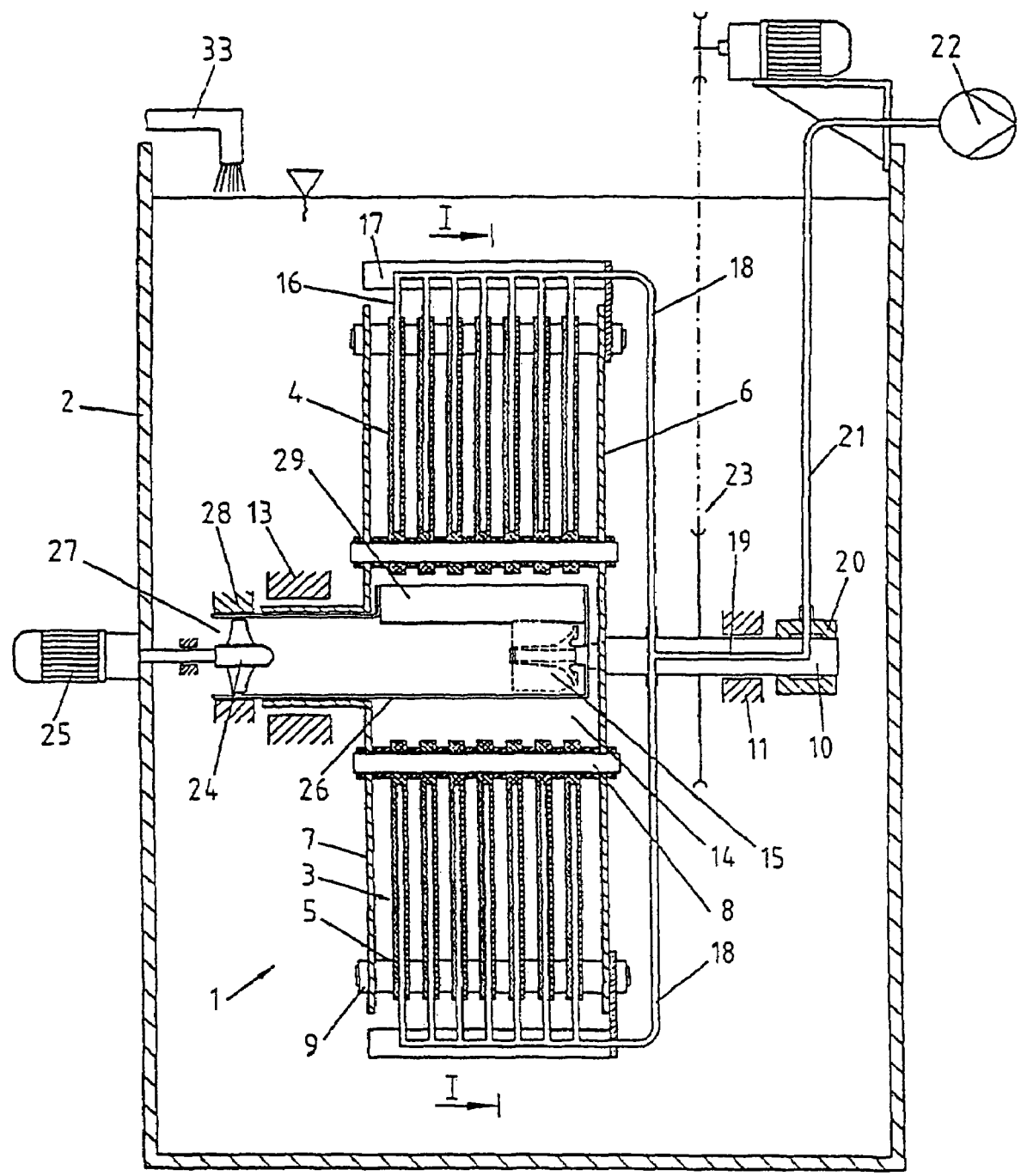
FIG. 3 shows a design variant with a built-in flow duct and possible arrangements of the flow members.
Figure 4:
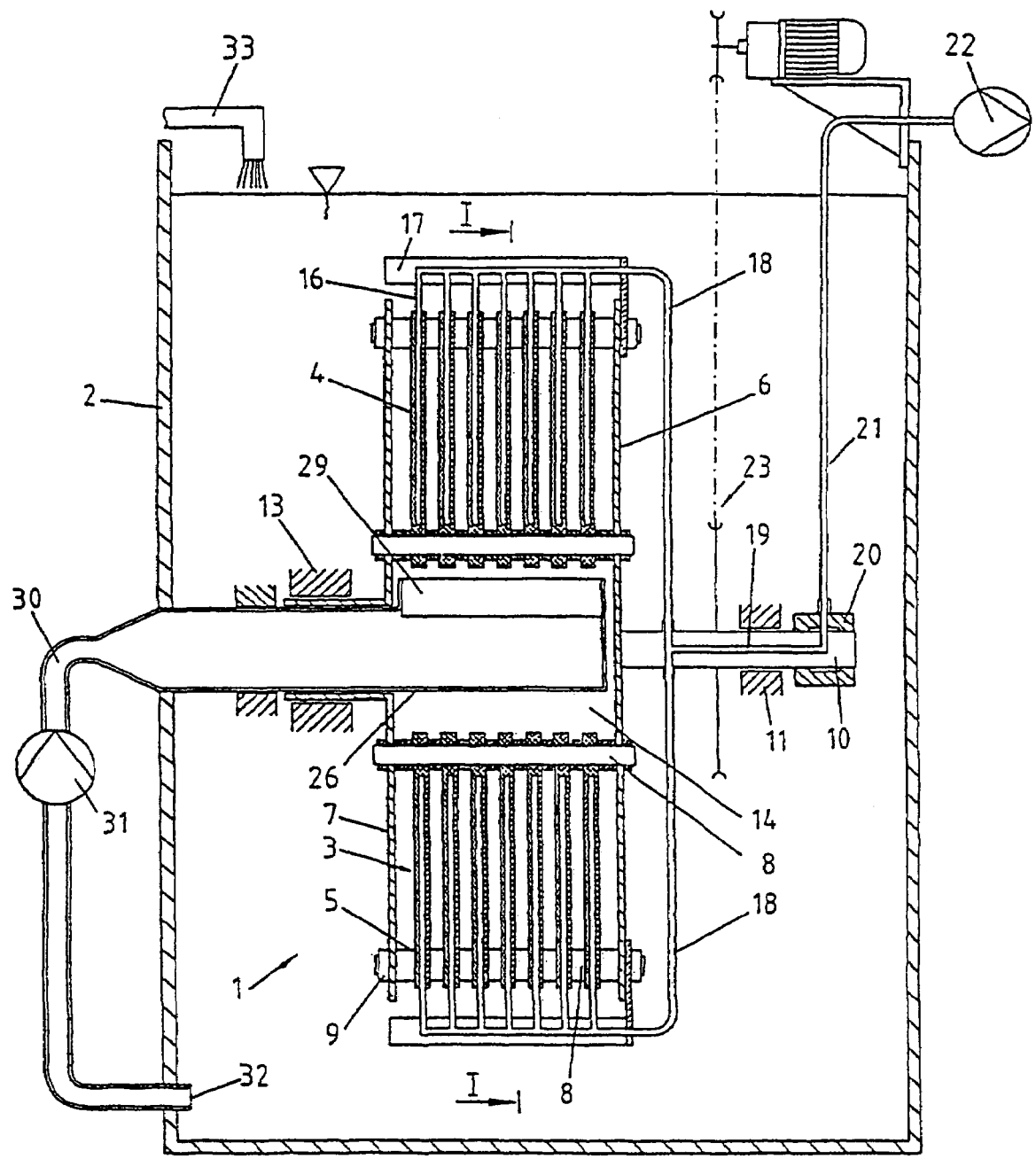
FIG. 4 shows a design variant with a flow duct and an integrated pump.
Figure 5:
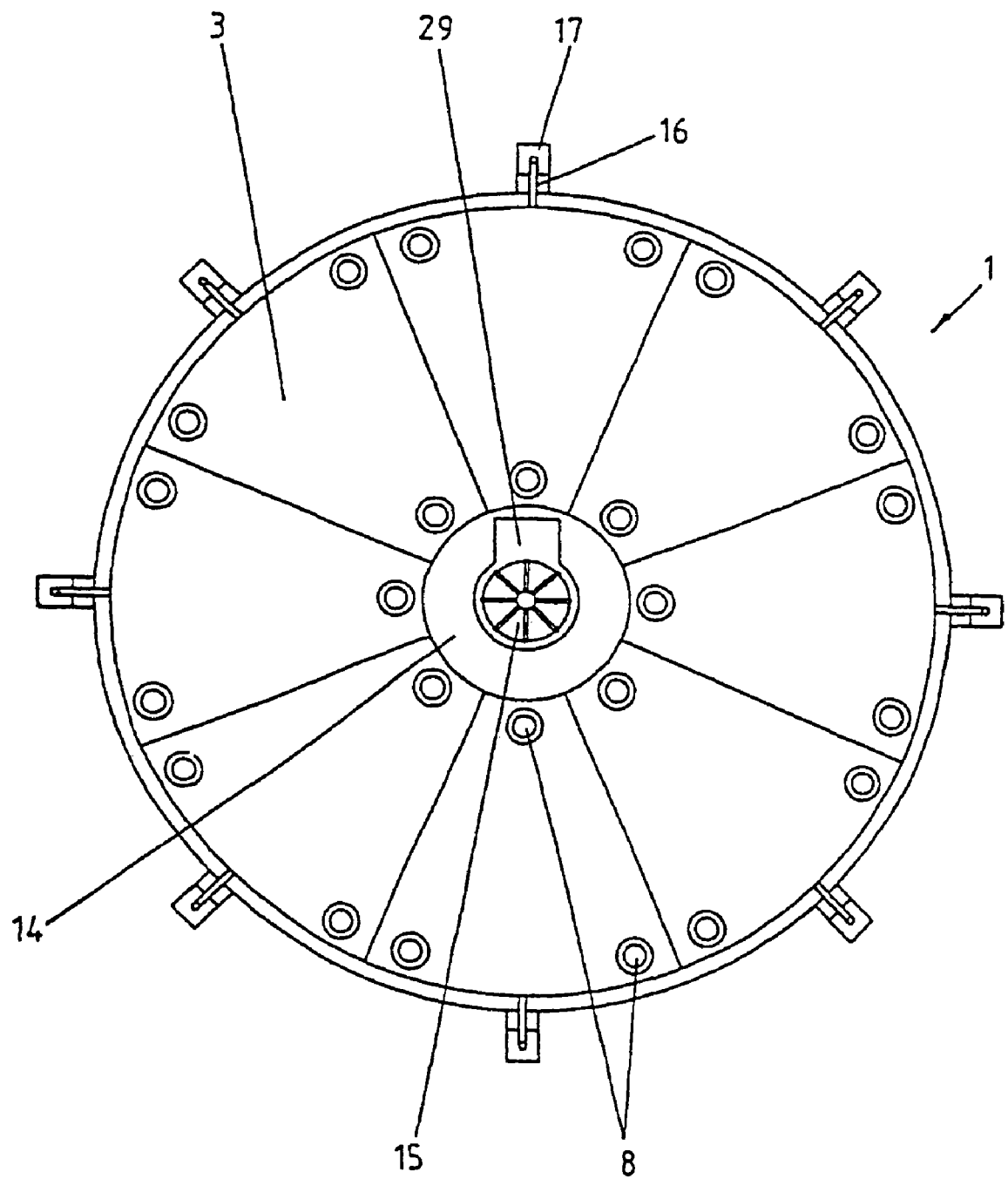
FIG. 5 shows a section along the line I-I according to FIG. 3.

In a further design possibility according to FIG. 2, there is provision for an axial vane wheel 24, which is driven separately via a motor 25, to be arranged in the suction-intake orifice 12 of the bearing flange 7. In an embodiment according to FIG. 3, a flow duct 26 is pushed in the suction-intake orifice 12 and has a suction-intake orifice 27 which is fastened to a support bearing 28. The cavity 14 is in this case connected to the suction-intake orifice 27 via a slot-shaped orifice 29. Both a pump vane wheel 15 and a motor-driven axial vane wheel 24 can be operated via the flow duct 26. FIG. 4 shows a further embodiment, in which the flow duct 26 is connected to a pump 31 via a pipeline 30 and issues through a suction-intake orifice 32 in the lower region of the vessel 2.

Operation is as follows:

During the rotational movement of the filter device 1, filtrate from the vessel 2 is sucked in via the vacuum pump 22, penetrates via the filters of the filter elements 4 and is discharged via suction-extraction lines 16, duct strips 17, pipelines 18, connecting ducts 19, the sliding ring 20 and the pipeline 21. The filter liquid in the vessel 2 is kept constant via an inflow 33. By means of the flow members provided, a defined flow between the spaced-apart filter elements is generated in the filter liquid via the suction-intake orifices 12, 27, 32, so that the solids attracted by the filter suction effect do not remain adhering to the filters and are constantly entrained by the liquid flow. As a result, during the entire filter operation, an automatic and continuous cleaning effect is achieved, without any action of wear on the filters. In addition to a relatively low investment outlay, as compared with conventional generic filter devices, the energy outlay is in this case also markedly reduced and the efficiency of the filter device is increased. By the avoidance of backwashing and intensive cleaning by means of clarified water, the filter capacity is increased.

It will be appreciated by those skilled in the art that various modifications and variations can be made in the present invention without departing from the scope of the invention. It is intended that the present invention include such modifications and variations as come within the scope of the appended claims and their equivalents.

What is claimed is:

1. A filter device for clarification of contaminated liquids, comprising:
   a vessel configured to contain the liquid to be clarified;
   a first carrying disk arranged within said vessel, said first carrying disk rotationally driven about a rotational axis;
   mounting rods attached to and extending generally perpendicular from said carrying disk;
   a plurality of filter modules including spaced apart filter elements extending generally parallel to said carrying disk, each of said filter modules rotationally fixed relative to said carrying disk at least in part by said mounting rods, said filter modules having a radially inward end spaced radially from said rotational axis of said carrying disk;
   said ends of said filter modules circumscribing a cavity within said vessel having a longitudinal axis corresponding to said rotational axis of said carrying disk;
   a flow member disposed within said cavity;
   wherein said flow member is radially spaced apart from the radially inward ends of said filter modules;
   and wherein said cavity is configured such that a cleaning fluid medium from within said cavity flows radially out from said cavity and between said filter elements to clean said filter elements, said flow member generating the flow of said fluid cleaning medium with said cavity.

2. The filter device as in claim 1, wherein said flow member is disposed along said longitudinal axis of said cavity.

3. A filter device for clarification of contaminated liquids, comprising:
   a vessel configured to contain the liquid to be clarified;
   a first carrying disk arranged within said vessel, said first carrying disk rotationally driven about a rotational axis;
   mounting rods attached to and extending generally perpendicular from said carrying disk;
   a plurality of filter modules including spaced apart filter elements extending generally parallel to said carrying disk, each of said filter modules rotationally fixed relative to said carrying disk at least in part by said mounting rods, said filter modules having a radially inward end spaced radially from said rotational axis of said carrying disk;
   said ends of said filter modules circumscribing a cavity within said vessel having a longitudinal axis corresponding to said rotational axis of said carrying disk;
   a flow member disposed within said cavity, said flow member comprising a pump vane wheel rotationally driven within said cavity; and
   wherein said cavity is configured such that a cleaning fluid medium from within said cavity flows radially out from said cavity and between said filter elements to clean said filter elements, said flow member generating the flow of said fluid cleaning medium with said cavity.

4. The filter device as in claim 1, wherein said cavity is in fluid communication with unclarified liquid within said vessel, said cleaning fluid medium comprising at least a portion of the unclarified liquid within said vessel.

5. The filter device as in claim 1, further comprising a second carrier disk spaced from said first carrier disk, said mounting rods extending longitudinally between said first and second carrier disks and said filter modules disposed between said first and second carrier disks.

6. The filter device as in claim 5, wherein at least one of said first or second carrier disks are in fluid communication with unclarified liquid within said vessel.

7. The filter device as in claim 1, further comprising a rotationally fixed longitudinally extending conduit member disposed within said cavity coincident with said rotational axis of said cavity, said conduit member configured for directing said cleaning fluid medium into said cavity.

8. The filter device as in claim 7, wherein space within said cavity surrounding said conduit member is in fluid communication with unclarified liquid within said vessel, such that at least a portion of said cleaning fluid medium includes the unclarified liquid within said vessel.

9. The filter device as in 8, wherein said conduit member is also in fluid communication with unclarified liquid within said vessel.

10. A filter device for clarification of contaminated liquids, comprising:
   a vessel configured to contain the liquid to be clarified;
   a first carrying disk arranged within said vessel, said first carrying disk rotationally driven about a rotational axis;
   mounting rods attached to and extending generally perpendicular from said carrying disk;
   a plurality of filter modules including spaced apart filter elements extending generally parallel to said carrying disk, each of said filter modules rotationally fixed relative to said carrying disk at least in part by said mounting rods, said filter modules having a radially inward end spaced radially from said rotational axis of said carrying disk;
   said ends of said filter modules circumscribing a cavity within said vessel having a longitudinal axis corresponding to said rotational axis of said carrying disk;
   a flow member disposed within said cavity;
   wherein said flow member includes a rotationally fixed longitudinally extending conduit member disposed within said cavity coincident with said rotational axis of said cavity, said conduit member having a slot-shaped orifice configured for directing said cleaning fluid medium into said cavity;
   and wherein said cavity is configured such that a cleaning fluid medium from within said cavity flows radially out from said cavity and between said filter elements to clean said filter elements, said flow member generating the flow of said fluid cleaning medium with said cavity.

* * * * *